United States Patent [19]

Rhodes

[11] Patent Number: 4,740,831
[45] Date of Patent: Apr. 26, 1988

[54] METHOD OF REFORMATTING COLOR TELEVISION SIGNALS BY ELIMINATING THE UNNECESSARY OVERSCANNED PORTIONS

[75] Inventor: Charles W. Rhodes, Atlanta, Ga.

[73] Assignee: Scientific Atlanta, Inc., Atlanta, Ga.

[21] Appl. No.: 869,996

[22] Filed: Jun. 3, 1986

[51] Int. Cl.$^4$ ............... H04N 11/20; H04N 11/10
[52] U.S. Cl. .................... 358/11; 358/133; 358/14
[58] Field of Search ............ 358/11, 12, 133, 14

[56] References Cited

U.S. PATENT DOCUMENTS

| | | | |
|---|---|---|---|
| 3,617,626 | 11/1971 | Bluth | 358/11 |
| 4,394,690 | 7/1983 | Kobayashi | 358/180 |
| 4,476,484 | 10/1984 | Haskell | 358/11 |
| 4,556,906 | 12/1985 | Dischert et al. | 358/180 |
| 4,564,857 | 1/1986 | LoCicero et al. | 358/12 |
| 4,567,508 | 1/1986 | Hulyer | 358/11 |
| 4,605,950 | 8/1986 | Goldberg et al. | 358/11 |
| 4,622,577 | 11/1986 | Reitmeier et al. | 358/11 |
| 4,631,574 | 12/1986 | LoCicero et al. | 358/12 |

FOREIGN PATENT DOCUMENTS 114693 8/1984 European Pat. Off. ........... 358/15

Primary Examiner—John W. Shepperd
Attorney, Agent, or Firm—Banner, Birch, McKie & Beckett

[57] ABSTRACT

A method of reformatting color television signals is disclosed whereby chrominance and luminance components are serially arranged on a line by line basis with minimal compression of the luminance and chrominance components. This reduced compression serial arrangement is made possible by a truncation process whereby unnecessary information is eliminated from the television signal. Specifically, since a normal television picture tube overscans, the edges of the picture are never displayed and need not be transmitted or recorded. By eliminating this unnecessary information the signals can be serially combined within the time limits inherent in standard signals.

36 Claims, 3 Drawing Sheets

METHOD OF REFORMATTING COLOR TELEVISION SIGNALS BY ELIMINATING THE UNNECESSARY OVERSCANNED PORTIONS

BACKGROUND OF THE INVENTION

This invention relates to the field of transmission and recording of color television signals.

Video tape recorders are available that can directly record television signals as they are normally broadcast. These recorders must have very high bandwidth capabilities to record such signals and are, therefore, very expensive. The common video recorders that are available on the market are less expensive and have much lower bandwidth capabilities. Since these low cost recorders cannot directly record television signals accurately, various types of processing are performed on the signals to reduce the bandwidth requirements. Standard television signals contain composite chrominance and luminance information broadcast during the active video portion of a conventional video line. FIG. 1 illustrates an NTSC composite color video signal. The active video portion is approximately 52.5 microseconds in duration with the entire video line occupying 63.5 microseconds. The remaining 11 microseconds is reserved for synchronizing pulses (H-SYNC), clamping, transition times, and a color reference signal (BURST). A typical prior art method of recording such a signal was to first separate the luminance and chrominance information and then record the separated signals on tape by different techniques, most commonly by frequency modulating the luminance component onto a carrier and amplitude modulating the chrominance signal onto a lower-frequency subcarrier. The signal containing the chrominance information is then added to the frequency modulated luminance carrier and the combined signal is recorded.

The above described method is subject to a number of problems including several sources of picture degradation such as a poor chrominance signal-to-noise ratio, gain and delay inequalities between chrominance and luminance and distortion such as differential phase and gain. These problems become amplified when several generations of copying occur.

Several methods have been introduced which attempt to alleviate some or all of the above sources of degradation. One involves arranging the chrominance and luminance information serially. A conventional composite video signal is reformatted serially into a new signal containing lines of serially arranged chrominance and luminance information. The chrominance and luminance components are compressed before they are arranged into the serial format. The compression step is necessary since the serially reformatted signal also has a line duration of 63.5 us and if the components are not compressed they cannot "fit" into this time period when they are arranged serially. FIG. 2 illustrates a typical signal where the luminance and chrominance data have been compressed and serially arranged. The luminance data has been compressed from its original 52.5 microseconds, the length of the active line portion, to 46 microseconds with the chrominance being further compressed to 11.5 microseconds. The chrominance data is usually time compressed more than the luminance data, typically by a small integer such as 2, 3 or 4. (Chrominance data usually consists of two color difference signals, here Cr and Cb, and is arranged on alternate lines with the corresponding luminance information Y).

This type of serially reformatted signal is similar to a Multiplexed Analog Component (MAC) signal which is proposed for satellite and cable television transmission. A MAC signal is a serially formatted signal with a luminance component that has been compressed from its original 52.5 microseconds to 35 microseconds and a chrominance component that is compressed to 17.5 microseconds. Although the use of MAC signals has overcome many of the problems inherent in the use of NTSC signals, several new problems have developed.

Television signals are transmitted along cable systems in a nominal 6 MHZ band. The (picture) carrier, by convention, must be 1.25 MHZ above the bottom end of the band; and the system response falls off above about 5.25 MHZ above the bottom of the band which leaves a usable 4 MHZ of bandwidth. Using 3:2 compression for luminance, this means that after decompression, the luminance signal will have a bandwidth of only ⅔ of 4.0 MHZ or 2.67 MHZ.

A similar problem is encountered in the use of consumer grade video recording equipment commonly sold on the market. As noted previously, a typical recorder has bandwidth limitations and the use of compressed signals causes problems similar to those encountered during cable transmission. U.S. Pat. No. 4,335,393 to Pearson, for example, discloses a method of recording a serially reformatted signal. Pearson compresses the luminance and chrominance data from its original duration in the active video region to form a signal similar to the one illustrated in FIG. 2. This compressed signal is then recorded. When Pearson's signal is recovered for playback there will have been a significant bandwidth loss due to the compression step. Several systems have been introduced which attempt to solve this problem.

U.S. Pat. No. 4,467,368 to Horstmann discloses a method of serially recording luminance and chrominance data. Horstmann time-expands the luminance signal before recording in order to avoid the bandwidth problems inherent in a system such as Pearson's. Since Horstmann has time expanded his signal, however, the signal will not fit within the 63.5 us limit and Horstmann must use two separate channels when recording (see FIG. 4). Each channel consists of a time expanded luminance signal and a compressed chrominance signal arranged serially. Since the recording is being performed in two channels, there is twice as much recording time per line and the signal can therefore be time expanded. The drawback to this method is that a much greater amount of recording space is required.

U.S. Pat. No. 3,781,463 to Van den Bussche is directed to a method of recording luminance and chrominance information serially in a single recording channel without using a compressed luminance signal. Since the luminance signal is not compressed, the chrominance signal must be compressed to a much greater degree than was necessary in other prior art systems to satisfy the time requirements. For example, the ratio between the length of the active line time and the length of the compressed chrominance signal is approximately 8 to 1. Such a high compression ratio means that there is also a high ratio between the time occupied by the luminance and chrominance components which will cause the signals to become degraded, with the color having the tendency to smear over the luminance. Such high ratios of time compression also reduce chroma Signal-to-Noise Ratio to unacceptable levels of performance.

Rhodes, C. W. "A tutorial on Improved Systems for Color Television Transmissions by Satellite." IEEE Transactions on Broadcasting Vol BC-31 No. 1 March 1985.

SUMMARY OF THE INVENTION

It is a principle object of the present invention to reformat color television signals to reduce the bandwidth requirements for transmission or recording.

Further, an important object of this invention is to reformat color television signals in such a way that luminance and chrominance data are accurately serially recorded in a single channel.

A further object of the invention is to avoid excessive compression of luminance and chrominance data when transmitting or recording color television signals.

Conventional television receivers overscan the screen horizontally by anywhere from 10%-18%. This means that only 82%-90% of each line of the transmitted picture signal is displayed. There is no need to transmit or record the portion of the video signal which is never displayed on the screen. Accordingly, a portion of the 52.5 microsecond active video time of a conventional signal can be truncated with no loss of useful information.

A time multiplexed signal or MAC signal is reformatted by a method comprising the steps of: (1) at least partially decompressing the compressed luminance component; (2) truncating both the decompressed luminance and compressed chrominance components; and (3) serially combining the components to form reformatted video lines. The order of these steps may be varied as indicated more fully below. The truncation step involves the elimination of signals that represent portions of the active line that can be eliminated without any loss of useful information since television picture tubes normally overscan and the left and right edges of the picture are not seen. With the reduction in signal length due to the truncation step, the decompressed luminance can be transmitted or recorded serially with a chrominance signal that is compressed by a low ratio.

DETAILED DESCRIPTION OF A PREFERRED EMBODIMENT

Standard television picture tubes overscan and the left and right edges of the picture are never seen. By eliminating this unnecessary information, television signals can be formatted in a serial manner with significantly less compression than that performed by prior art systems. Approximately 10-18% of the actual line time of 52.5 microseconds contains information that the picture tube does not display. The elimination of this portion of the signal requires less information to be transmitted or recorded. The luminance and chrominance signals can now be combined with much less compression than that which was necessary when the entire active video portion was used.

Figure 2:
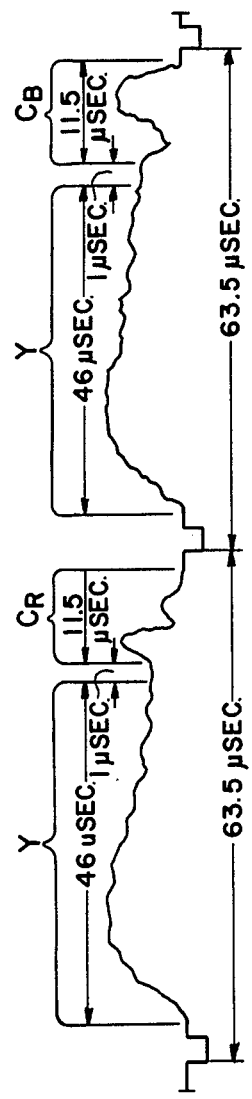
FIG. 2 illustrates two scan lines of the prior art MAC signal.
Figure 3:
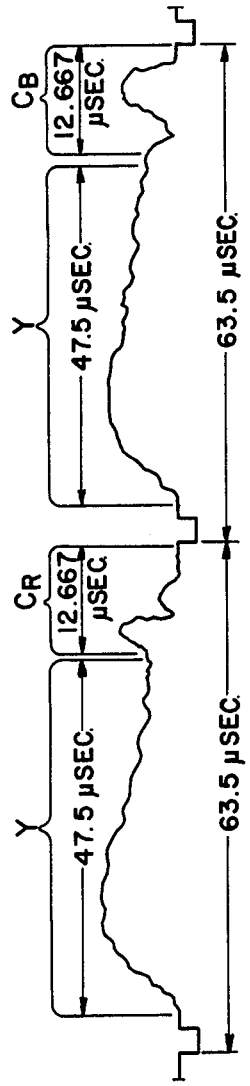
FIG. 3 illustrates two scan lines of the reformatted MAC signal.

When reformatting a signal such as the one illustrated in FIG. 2 for recording on conventional video recorders, the luminance signal is decompressed to restore it to its original 52.5 microseconds. The first 2.5 microseconds and the last 2.5 microseconds of the signal are then eliminated resulting in a 47.5 microsecond signal. The compressed chrominance data is also truncated by an amount corresponding to the same five microseconds of the active video region. If the chrominance signal had been compressed by a 4 to 1 ratio (or reduced to 13.125 microseconds) then 5.0/4.0=1.25 microseconds would be eliminated resulting in an 11.875 microsecond chrominance signal. The combined luminance and chrominance signals now only occupy a total time of 59.375 microseconds which allows the signals to be serially recorded within the 63.5 microsecond limit. The chrominance signal can be compressed by other appropriate ratios such as 15:4 which would result in a 12.667 $((47.5 \times 4)/15)$ microsecond chrominance signal. FIG. 3 illustrates such a reformatted signal.

The elimination of the unnecessary portion of the signal has allowed the signal to be reformatted into a serial combination of luminance and chrominance without compressing the luminance and with only minimal compression of chrominance. Since the luminance signal is not compressed there will be no reduction in bandwidth on playback and, therefore, the entire available bandwidth of 4.0 MHZ may be utilized. This is a significant improvement over systems which record compressed liminance data.

Figure 1:
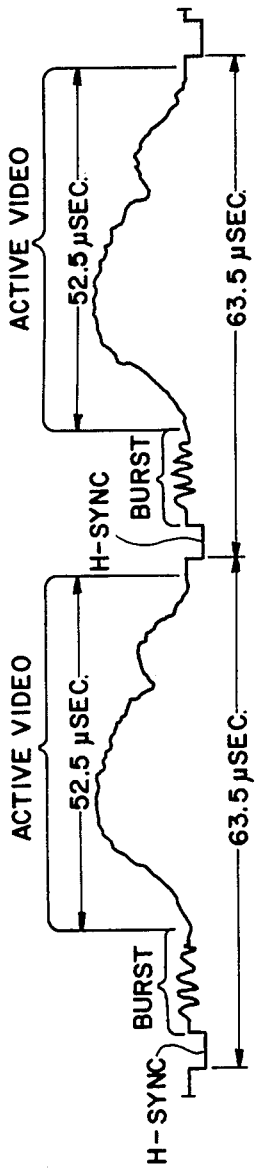
FIG. 1 illustrates two scan lines of the prior art NTSC signal.

If it is desired to reformat a standard television signal such as the signal illustrated in FIG. 1, the method would comprise the following steps: (1) separating the luminance and chrominance components; (2) truncating 2.5 microseconds from the beginning and end of both the luminance and chrominance signals; (3) compressing the chrominance signal by an appropriate amount such as 4 to 1 and (4) serially combining the two signals.

Figure 4:
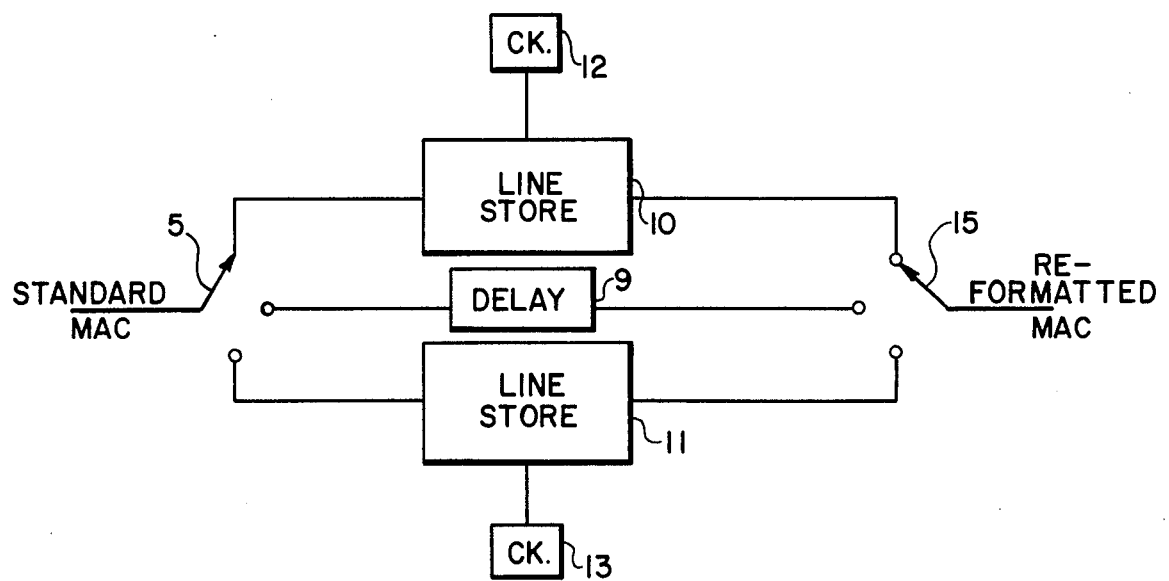
FIG. 4 illustrates a system for converting from the prior art MAC signal to the reformatted MAC signal.

FIG. 4 shows one embodiment of a system that can perform such a reformatting operation. For illustrative purposes, the system will be described operating on a standard MAC signal. As previously described, such a signal uses a 3 to 2 compression for luminance and a 3 to 1 compression for chrominance.

The MAC signal is received by a satellite dish or other means and is supplied to time gate 5. Gate 5 allocates the signal between three possible paths, and will be in the upper position, supplying line store 10, during that portion of the line that represents the luminance information that will be recorded. Gate 5 will not supply all of the luminance information to line store 10 but only the portion that will be displayed by the television. For example, if 5.0 us of the original active line time is to be truncated, then ⅔ of 5.0 us of the 35 us luminance period or 3.334 us of this signal will not be supplied to line store 10. The truncated portion of course, will be taken in equal increments from both sides of the active video portion. Similarly, gate 5 will be in the lowermost position in FIG. 4, supplying line store 11 during the portion of each video line that represents desirable chrominance information. According to our example, 5.0 us of the active line time or ⅓ of 5.0 us of the compressed signal will be truncated. This 1.67 us will also be eliminated in equal amounts from each end of the chrominance portion (0.835 us from each end). During those portions, gate 5 is in the center position thus delivering data to delay 9.

Line stores 10 and 11 read the truncated information into memory. The speed at which the data is read into the memory and subsequently written out of the memory is controlled by clocks 12 and 13. By varying the ratio of the read in to write out rates, the data can be decompressed or compressed by any desired amount. For example, if luminance data is read into line store 10 at a frequency of F1, it can be completely decompressed by writing it out of line store 10 at a frequency equal to ($\frac{2}{3}$) F1. In this manner the original 3 to 2 compression of the luminance data is eliminated. The compression of the chrominance data is similarly controlled by line store 11 and clock 13. If it is desireable not to change the compression of any data, it would simply be read and written at the same rate.

Time gate 15 will be operative to supply the truncated signals to an output. There are three positions for gate 15. In the uppermost position, the truncated, decompressed luminance data is supplied to the output while in the lower position the truncated chrominance data is supplied to the output. As noted earlier, the chrominance data may or may not have been compressed or decompressed, depending upon the difference between its initial compression rate and the rate desired for the output. The 3 to 1 compression of chrominance contained in a standard MAC signal is undesirable since the remaining time per line after decompressing the luminance data will be insufficient for sync, clamping and transition times. To obtain the desirable signal shown in FIG. 3, the chrominance compression should be read into line store 11 at frequency F1, and read out at (5/4) F1. This would result in a total compression of (3/1)(5/4), or 15 to 4. Delay 9 functions to assure that the sync pulses and other data are delivered to the output at the appropriate time. Other delays may be used as necessary. The information should become available to gate 15 in a sequential manner in order to form the reformatted video lines. In other words, for a particular line, line store 11 would first write out its chrominance data with gate 15 set on the lower level. Next, line store 10 would read out its data and then delay 9 would follow. The order of these operations is unimportant and may be varied as desired. The reformatted MAC signal can then be supplied to a standard VCR for recording.

Figure 5:
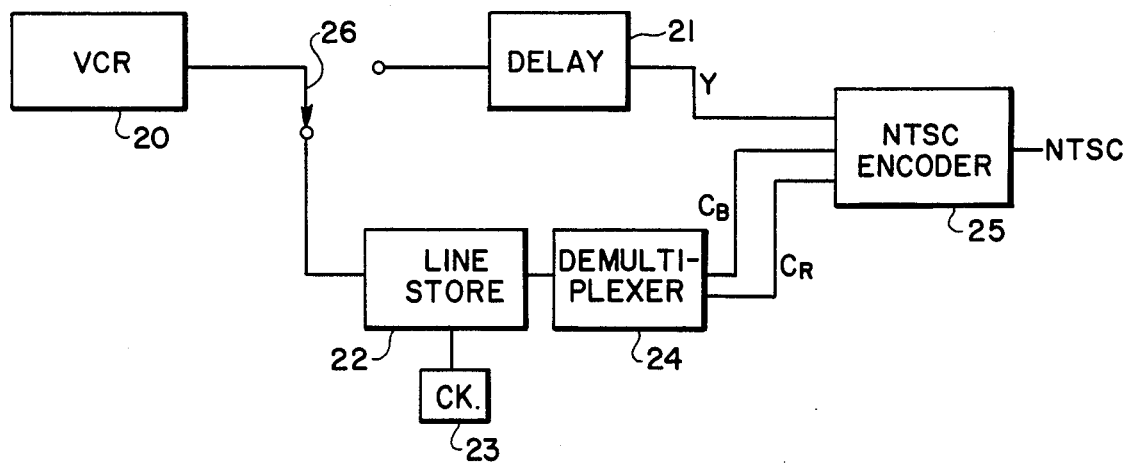
FIG. 5 illustrates a system for converting from the reformatted MAC signal to a compatable NTSC signal.

FIG. 5 shows a system used during playback for changing the reformatted recorded signal to NTSC for display on a television screen. The signal is played by VCR 20 and is supplied to a time gate 26. Gate 26 has two possible positions. The lower position supplies chrominance information to a line store 22. By controlling the read and write rates of clock 26 as previously discussed, the chrominance information is decompressed. The decompressed signals are supplied to demultiplexer 24 which separates the Cr chrominance from the Cb chrominance. These signals are then supplied to a NTSC encoder. During that portion of each line that does not contain chrominance information, gate 26 is in the upper position and supplies the rest of the signal, including the luminance data, to a time delay 21. Delay 21 assures that luminance and chrominance information from the same line arrive at the NTSC encoder 25 simultaneously. The encoder 25 receives the three signals and produces a standard NTSC output. Such encoders are commmon and encoder 25 is not, therefore, shown in greater detail.

Alternatively, the Cr, Cb and Y outputs could be supplied to a matrix which would produce R, G and B outputs. These outputs could then be supplied to appropriate analog baseband inputs on the consumer's television.

Figure 6:
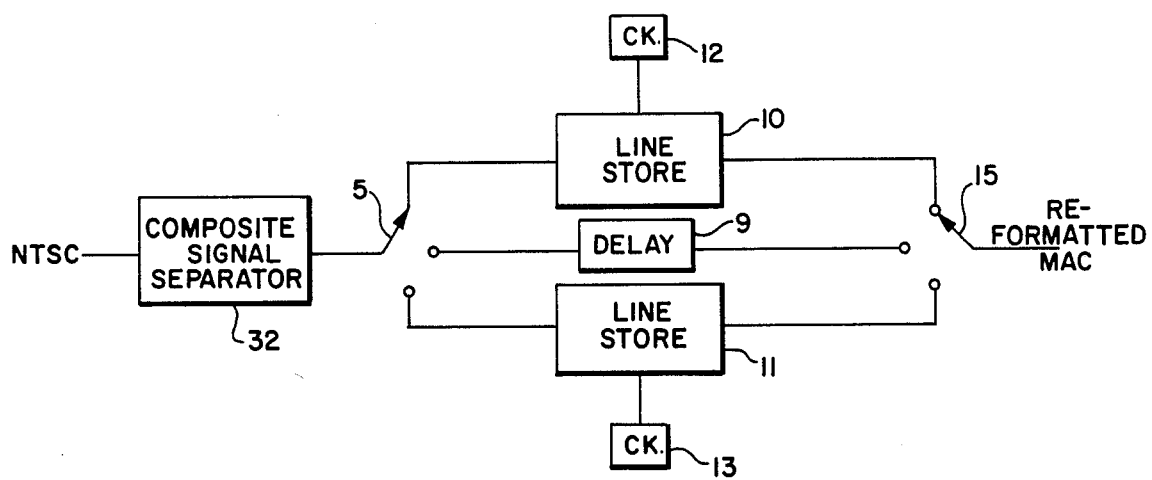
FIG. 6 illustrates a system for converting from the prior art NTSC signal to the reformatted MAC signal.

As discussed above, a standard television signal such as the signal illustrated in FIG. 1 can also be reformatted in accordance with the method of this invention. FIG. 6 shows a system that can perform such a reformatting operation. The system illustrated in FIG. 6 is substantially identical to the system of FIG. 4, the only difference being the addition of composite signal separator 32. Separator 32 will receive a standard NTSC signal and will serially reformat the signal in a manner similar to a MAC signal. The serially reformatted signal is then supplied to time gate 5 which will operate in conjunction with the remainder of the circuit in exactly the same manner as discussed above in relation to FIG. 4. There have been many devices disclosed in the prior art which function to convert NTSC signals to serially formatted signals, and it is therefore unnecessary to specifically describe the operation of composite signal separator 32.

When a signal is to be reformatted for transmission purposes the same principle applies although a transmitted signal must keep the video portion within the original 52.5 us active line time. In other words, when the signal is being reformatted for recording purposes a larger portion of the 63.5 us line time can be used to carry the video information. In transmission, however, their is no extra time available and the luminance and chrominance data must be confined to 52.5 us. Approximately 10% of the active video line of 52.5 us will be truncated. A truncation leaving 90.4% of the active line has achieved the best results. The active line of 52.5 us is thereby reduced to 47.46 us.

It is possible to reformat the signal so that the luminance component is completely decompressed as was done when reformatting for recording purposes. This would leave 5.04 us to carry the chrominance data (52.5-47.46). The chrominance data would have to be compressed by a ratio of more than 9 to 1 which is undesirable since it would severely reduce the available bandwidth for chrominance. In the preferred embodiment the chrominance is compressed by a 6 to 1 ratio thus reduced the 47.46 us chrominance signal to 7.91 us. This leaves 44.59 us to carry the luminance data. It is undesirable to utilize all of this time since a small amount of time is required for transition times, etc. The luminance signal is therefore compressed from its original 47.46 us (after truncation) to 44.33 us. This is a compression ratio of approximately 1.0706 to 1. It may be desirable to low pass filter the chrominance signal prior to compressing the signal in order to avoid problems with aliasing.

By using a low compression ratio for luminance, a signal can be transmitted down a cable system utilizing most of the available 4.0 MHZ of bandwidth. Specifically, by compressing the signal by a 1.0706 to 1 ratio the utilized bandwidth is 3.74 MHZ (4.0/1.0706).

In reformatting television signals, either for recording or transmitting purposes, the present invention relies on the basic premise that there is no need to transmit or record data which is not displayed on the television screen. The amount of truncation that has been performed in the illustrative embodiments contained herein does not eliminate all of the overscan since different televisions overscan by varying degrees. Some of the overscan should therefore be left in order to insure that the edges of the picture can never be seen on the screen. It is, however, possible that some consumers may have televisions that overscan by less than a "normal" amount and picture edges will be displayed.

In order to correct for the above unlikely although possible occurrence, the displayed picture can be adjusted by the consumer. A slight expansion of the display picture can be performed in the same way that other expansions and compressions have been effectuated in the above illustrative embodiments. Prior to display, the signal can be read into a line store at a certain frequency and subsequently read out a slightly lower frequency, thus slightly expanding the picture. This could be easily performed using the components in a standard subscriber decoder. A typical decoder receives a MAC signal and reads it into line stores at the standard rate (the same rate that is received). Decompressions are formed by clocking the data out at a slower rate. A variable switch could be provided so that a subscriber could slightly adjust the read out rate, thus changing the size of the displayed picture.

The specific embodiments recited above are given only for illustrative purposes and it should be clearly understood that various modifications are possible. The precise amount of truncation can be varied, for example, as can the specific compression ratios used. The specific order of the steps performed by the present invention may also be modified. For example, the truncation can be performed before or after decompression or compression. Similarly, various modifications of the components, parts etc. may be employed without departing from spirit of the invention or the scope of the appended claims.

I claim:

1. A method of reformatting each line of a time multiplexed color television signal such as a MAC signal, wherein each line comprises a serially combined compressed luminance and compressed chrominance component, comprising the steps of:
   at least partially decompressing the compressed luminance component;
   truncating a portion of both the luminance and chrominance components that represents an overscanned portion of the television signal; and
   serially combining the components to form reformatted video lines.

2. The method of claim 1 wherein said portion comprises approximately 10% of each of said components.

3. The method of claim 1 wherein said said luminance component is completely decompressed.

4. The method of claim 3 wherein said compressed chrominance component is compressed by a ratio of less than or equal to 9 to 2.

5. The method of claim 3 wherein said color television signal comprises a chrominance component that is compressed by a ratio of greater than 9 to 2, said method further comprising the step of partially decompressing said chrominance component to a ratio of less than or equal to 9 to 2 before said step of serially combining.

6. The method of claim 3 wherein said color television signal comprises a chrominance component that is compressed by a ratio of less than 3 to 1, said method further comprising the step of further compressing said chrominance component to a ratio greater than 3 to 1 but less than 9 to 2 before said step of serially combining.

7. The method of claim 6 wherein said chrominance component is further compressed to a 4 to 1 ratio.

8. The method of claim 6 wherein said chrominance component is further compressed to a 15 to 4 ratio.

9. The method of claim 3 wherein said decompressed luminance component has a duration of about 52.5 microseconds.

10. The method of claim 9 wherein said step of truncating comprises eliminating approximately the first and last 2.5 microseconds of said 52.5 microsecond luminance signal.

11. The method of claim 1 wherein said compressed chrominance component was compressed from a signal which had a duration of about 52.5 microseconds.

12. The method of claim 11 wherein said step of truncating comprises eliminating portions of the compressed chrominance signal that approximately correspond to the first and last 2.5 microseconds of its original 52.5 microsecond duration.

13. The method of claim 1 wherein said luminance component is partially decompressed to a duration of about 44.33 microseconds.

14. The method of claim 13 wherein said chrominance component is compressed to a duration of about 7.91 microseconds.

15. The method of claim 1 wherein the duration of the luminance component of each line can be adjusted by a subscriber prior to the display of said television signal.

16. The method according to claim 15 wherein said consumer can adjust the duration of each luminance component by varying a read clock frequency within an encoder supplying the television signal to the subscriber's television receiver.

17. A method of formatting each line of a standard color television signal, wherein each line comprises composite chrominance and luminance information, comprising the steps of:
   separating the composite signal into chrominance and luminance components;
   truncating a portion of each of the chrominance and luminance components that represents an overscanned portion of the television signal;
   compressing the chrominance component; and
   serially combining the luminance and compressed chrominance components to form reformatted video lines.

18. The method of claim 17 further comprising the step of compressing said luminance component after said step of truncating.

19. The method of claim 17 wherein said portion comprises approximately 10% of each of said components.

20. The method of claim 19 wherein each of said luminance and chrominance components has a duration of about 52.5 microseconds.

21. The method of claim 20 wherein said step of truncating comprises eliminating about 2.5 microseconds from each end of each of said luminance and chrominance components.

22. The method of claim 19 wherein said chrominance component is compressed by a ratio of 4 to 1.

23. The method of claim 19 wherein said chrominance component is compressed by a ratio of 15 to 4.

24. A method of reformatting each line of a time multiplexed color television signal such as a MAC signal, wherein each line comprises serially combined compressed luminance and compressed chrominance components, comprising the steps of:
- decompressing the compressed luminance component;
- truncating a portion of both the decompressed luminance component and the compressed chrominance component said portion representing an overscanned portion of the television signal; and
- serially combining the components for recording and playback on a single recording channel with a chrominance compression ratio of less than or equal to 9 to 2.

25. An apparatus for reformatting each line of a time multiplexed color television signal such as a MAC signal, wherein each line comprises a serially combined compressed luminance and compressed chrominance component, said apparatus comprising:
- decompressing means for at least partially decompressing the compressed luminance component;
- truncating means for truncating a portion of both the luminance and chrominance components that represents an overscanned portion of the television signal; and
- combining means for serially combining the components to form reformatted video lines.

26. The apparatus of claim 25 wherein said portion comprises approximately 10% of each of said components.

27. The apparatus of claim 25 wherein said truncating means truncates approximately 5% from each end of each component.

28. The apparatus of claim 25 wherein said decompressing means completely decompresses said luminance component.

29. The apparatus of claim 28 wherein said chrominance component is compressed by a ratio less than or equal to 9 to 2.

30. The apparatus of claim 28 wherein said chrominance component is compressed by a ratio of greater than 9 to 2, said apparatus further comprising second decompressing means for partially decompressing said chrominance component to a ratio less than or equal to 9 to 2.

31. The method of claim 28 wherein said chrominance component is compressed by a ratio of less than 3 to 1, said apparatus further comprising compressing means for compressing said chrominance component to a ratio greater than 3 to 1 but less than 9 to 2.

32. The apparatus of claim 25 wherein said luminance component is decompressed to a duration of about 44.33 microseconds.

33. The apparatus of claim 32 wherein said chrominance component is compressed to a duration of about 7.01 microseconds.

34. The apparatus of claim 25 further comprising adjusting means for adjusting the duration of the luminance component of each line so that a subscriber may adjust the width of the picture displayed on a television receiver.

35. An apparatus for reformatting each line of a standard color television signal, wherein each line comprises composite chrominance and luminance information, said apparatus comprising:
- separating means for separating the composite signal into chrominance and luminance components;
- truncating means for truncating a portion of each of the chrominance and luminance components that represents an overscanned portion of the television signal;
- compressing means for compressing each chrominance component; and
- combining means for serially combining the components to form reformatted video lines.

36. The apparatus of claim 35 further comprising second compressing means for compressing said luminance component.

* * * * *